United States Patent
Kwizera et al.

(10) Patent No.: US 10,699,307 B2
(45) Date of Patent: Jun. 30, 2020

(54) METHODS AND SYSTEMS FOR OFFERING FINANCIAL PRODUCTS

(71) Applicant: International Business Machines Corporation, Armonk, NY (US)

(72) Inventors: Felix B. Kwizera, Nairobi (KE); Eric Mibuari, Cambridge, MA (US); Violette Ogega, Kisii (KE); Skyler Speakman, Nairobi (KE); Isaac W. Wambugu, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 15/724,617

(22) Filed: Oct. 4, 2017

(65) Prior Publication Data
US 2019/0102799 A1    Apr. 4, 2019

(51) Int. Cl.
*G06Q 30/00* (2012.01)
*G06Q 30/02* (2012.01)
*G06Q 40/02* (2012.01)
*G06Q 10/06* (2012.01)

(52) U.S. Cl.
CPC ..... *G06Q 30/0267* (2013.01); *G06Q 30/0264* (2013.01); *G06Q 30/0269* (2013.01); *G06Q 10/067* (2013.01); *G06Q 40/025* (2013.01)

(58) Field of Classification Search
None
See application file for complete search history.

(56) References Cited

U.S. PATENT DOCUMENTS

| | | | | |
|---|---|---|---|---|
| 6,195,646 B1* | 2/2001 | Grosh | | G06Q 20/102 705/26.41 |
| 6,334,110 B1* | 12/2001 | Walter | | G06Q 30/02 705/14.41 |
| 7,930,204 B1* | 4/2011 | Sharma | | G06Q 30/0203 705/7.32 |
| 9,619,583 B2* | 4/2017 | Lau | | G06F 16/90335 |
| 2003/0130861 A1* | 7/2003 | Seitz | | G06Q 10/06 705/400 |
| 2003/0195832 A1* | 10/2003 | Cao | | G06Q 30/08 705/37 |
| 2003/0220773 A1* | 11/2003 | Haas | | G06Q 10/0637 703/2 |
| 2004/0181370 A1* | 9/2004 | Froehlich | | G06F 9/5083 702/187 |
| 2004/0181457 A1* | 9/2004 | Biebesheimer | | G06Q 30/02 705/14.49 |
| 2005/0071182 A1* | 3/2005 | Aikens | | G06Q 10/00 705/500 |

(Continued)

OTHER PUBLICATIONS

STIC EIC 3600 Search Report—dated Nov. 26, 2019.*

*Primary Examiner* — Matthew T Sittner
(74) *Attorney, Agent, or Firm* — Eyal Gilboa; Ryan, Mason & Lewis, LLP

(57) ABSTRACT

The disclosure provides systems and methods for analysis of financial data and customization of financial products. Time-dependent data is obtained for a relatively large set of users, and from the data are determined a relatively small set of trajectories that model user behaviour. New users are characterized according to the trajectories and financial products are automatically personalised to suit the new user.

16 Claims, 5 Drawing Sheets

(56) References Cited

U.S. PATENT DOCUMENTS

| | | | |
|---|---|---|---|
| 2005/0189415 A1* | 9/2005 | Fano | G06N 20/00 235/383 |
| 2005/0256946 A1* | 11/2005 | Childress | G06Q 10/06 709/223 |
| 2006/0089866 A1* | 4/2006 | Cheng | G06Q 10/10 709/204 |
| 2006/0111973 A1* | 5/2006 | Brown | G06Q 30/02 705/14.27 |
| 2006/0167984 A1* | 7/2006 | Fellenstein | G06F 9/5072 709/203 |
| 2007/0143171 A1* | 6/2007 | Boyd | G06Q 30/06 705/306 |
| 2008/0167928 A1* | 7/2008 | Cao | G06Q 10/06 705/80 |
| 2008/0319829 A1* | 12/2008 | Hunt | G06Q 30/0201 705/7.29 |
| 2009/0030829 A1* | 1/2009 | Chatter | G06Q 30/0206 705/37 |
| 2010/0250296 A1* | 9/2010 | Channabasavaiah | G06Q 10/04 705/7.25 |
| 2010/0262509 A1* | 10/2010 | Delia | G06Q 10/02 705/26.1 |
| 2011/0004509 A1* | 1/2011 | Wu | G06Q 10/06375 705/7.37 |
| 2011/0238477 A1* | 9/2011 | Urbanski | G06Q 30/0224 705/14.25 |
| 2012/0029974 A1* | 2/2012 | Councill | G06Q 30/0206 705/7.35 |
| 2012/0030199 A1* | 2/2012 | Mohajer | G06Q 30/0256 707/723 |
| 2012/0221430 A1* | 8/2012 | Naghmouchi | G06Q 30/0283 705/26.7 |
| 2012/0290348 A1* | 11/2012 | Hackett | G06Q 10/06 705/7.13 |
| 2012/0290500 A1* | 11/2012 | Ettl | G06Q 30/0283 705/36 R |
| 2012/0303400 A1* | 11/2012 | Boss | G06Q 30/06 705/7.12 |
| 2012/0303491 A1* | 11/2012 | Hill | G06Q 30/06 705/27.2 |
| 2013/0054296 A1* | 2/2013 | Gajakosh | G06Q 10/06 705/7.22 |
| 2013/0246213 A1* | 9/2013 | Lee | G06Q 30/0283 705/26.4 |
| 2013/0275085 A1* | 10/2013 | Cheng | G06Q 10/0639 702/182 |
| 2013/0297412 A1* | 11/2013 | Batra | G06F 16/00 705/14.49 |
| 2014/0052492 A1* | 2/2014 | Boss | G06Q 10/06315 705/7.25 |
| 2014/0096140 A1* | 4/2014 | Aquino | G06Q 10/1095 718/103 |
| 2014/0310065 A1* | 10/2014 | Chowdhary | G06Q 30/0283 705/7.35 |
| 2015/0100384 A1* | 4/2015 | Ettl | G06Q 30/0206 705/7.35 |
| 2016/0140789 A1* | 5/2016 | Wickersham, III | H04W 4/021 705/12 |
| 2016/0148227 A1* | 5/2016 | Choe | G06Q 30/0202 705/7.31 |
| 2016/0203506 A1* | 7/2016 | Butler, IV | G06Q 30/0222 705/14.23 |
| 2017/0004408 A1* | 1/2017 | Edelen | G06N 7/005 |
| 2017/0372341 A1* | 12/2017 | Fukuda | G06Q 30/0206 |
| 2017/0372349 A1* | 12/2017 | Fukuda | G06Q 30/0244 |
| 2017/0372378 A1* | 12/2017 | Firth | G06Q 10/04 |
| 2019/0102799 A1* | 4/2019 | Kwizera | G06Q 30/0267 |

* cited by examiner

METHODS AND SYSTEMS FOR OFFERING FINANCIAL PRODUCTS

FIELD OF THE INVENTION

In embodiments, the technical field of the invention is methods and systems for analysis of financial data and customization of financial products.

BACKGROUND

Financial institutions are continuously making efforts to improve the products that they offer to users. Such improvements typically take one of two forms—improving the user experience (i.e., the quality, relevancy, ease of use, etc.), and improving the return for the financial institution (i.e., increasing profit, reducing risk, increasing uptake by the client, etc.). In order to make such improvements, financial institutions rely on a variety of information such as conventional statistics (e.g., daily or monthly means, maximums, and/or minimums of user accounts), job status, current debt or debt-to-income ratio, or the like. These conventional statistics are often, however, relatively mediocre predictors of user behavior, loan performance, and risk, and improved methods of predicting such factors are continuously sought by financial institutions.

Financial products are increasingly offered to users via mobile platforms, yet the mobile platform has remained largely as a conduit rather than a source of primary data for the financial institutions. Nevertheless, mobile penetration in many rural and developing areas—i.e., regions where traditional banking services are relatively less common—is quite high, and often those mobile services include mobile money accounts and mobile banking services. Financial institutions would be well served using non-traditional sources of data for offering tailor-made financial services and products.

SUMMARY OF THE INVENTION

In an aspect, then, is a method for processing financial information comprising: applying a group-based trajectory model (GBTM) algorithm to time-dependent financial data for a first financial variable for a plurality of users to determine a plurality of first financial variable trajectories; for a set of first financial variable time-dependent data for a new user, determining a best fitting trajectory from the plurality of first financial variable trajectories; transmitting a message, via a distributed network, to a recipient device selected from a user device associated with the new user and a provider device associated with a provider, the message comprising content determined at least in part by the best fitting trajectory, the message configured to alter a user interface of the recipient device to display the content, wherein the content comprises an offer for a financial product, and wherein at least one variable pertaining to the financial product is determined at least in part by the best fitting trajectory; and coordinating reconfiguration of the recipient device based on the offer for a financial product. In embodiments:

the recipient device is a user device;
the recipient device is a user device selected from a mobile phone and a tablet;
the recipient device is a provider device;
the recipient device is a provider device selected from a server, a mobile device (e.g., mobile phone, tablet, etc.), and desktop computer;

the reconfiguration is a non-volatile change to the recipient device;
the reconfiguration of the recipient device involves any combination of the following: changing a setting in the device; altering a user interface of the recipient device to display one or more variables about the offered financial product (e.g., status of the offer, status of an accepted product, outstanding balance, payments made, credit available, and the like); altering an application stored in a memory of the recipient device to display a new field, the new field related to the offered financial product (e.g., outstanding balance, payments made, credit available, and the like); set an alert schedule to provide scheduled reminders (e.g., visual or audible alerts, email reminders, SMS reminders, etc.) to the user or provider; and updating a profile of the user on the provider device.

the method further comprises receiving via the distributed network the set of first financial variable time-dependent data for the new user;

the first financial variable is selected from a savings account balance, an outstanding credit balance, a credit capacity, a length of credit history, a number of deposits, a number of withdrawals a number of loans, a number of repayments, a number of balance queries an amount of interest earned over time, an amount of largest deposit, an amount of largest withdrawal, an average deposit, and an average withdrawal;

the plurality of first financial variable trajectories comprises between 2 and 10 trajectories;

further comprising applying the GBTM algorithm to time-dependent financial data for a plurality of additional financial variable for the plurality of users to determine a plurality of financial variable trajectories for each of the plurality of additional financial variables;

further comprising applying the GBTM algorithm to time-dependent financial data for a plurality of additional financial variable for the plurality of users to determine a plurality of financial variable trajectories for each of the plurality of additional financial variables, and further comprising determining best fitting trajectories for each of the additional financial variables for the new user from the plurality of financial variable trajectories for each of the plurality of additional financial variables;

the message is transmitted to the provider device and wherein the content further comprises characterization of the new user based on the best fitting trajectory;

the at least one variable is selected from a loan amount, an interest rate, and a repayment schedule;

further comprising applying the GBTM algorithm to time-dependent financial data for a plurality of additional financial variable for the plurality of users to determine a plurality of financial variable trajectories for each of the plurality of additional financial variables, and the message is transmitted to the provider device and wherein the content further comprises characterization of the new user based on the best fitting trajectory;

further comprising applying the GBTM algorithm to time-dependent financial data for a plurality of additional financial variable for the plurality of users to determine a plurality of financial variable trajectories for each of the plurality of additional financial variables, and the at least one variable is selected from a loan amount, an interest rate, and a repayment schedule; and the first financial variable is selected from a savings account balance, an outstanding credit balance, a credit capacity, a length of credit history, a number of deposits, a number of withdrawals a number of loans, a number of repayments, a number of balance queries an amount of interest earned over time, an amount of largest deposit, an amount of largest withdrawal, an average deposit, and an average withdrawal, and the message is transmitted to the provider device and wherein the content further comprises characterization of the new user based on the best fitting trajectory.

In an aspect is a method comprising: obtaining time-dependent financial data for a plurality of users between a first time and a second time; applying an algorithm to reduce the time-dependent financial data for a plurality of users to a plurality of representative trajectories; obtaining time-dependent financial data for a new user between the first time and the second time; comparing time-dependent financial data for the new user with the trajectories, and identifying the trajectory of best fit; determining a financial product for the new user at least in part based on the trajectory of best fit; automatically executing an electronic fund transfer into a user account associated with the new user based on the determined financial product; and altering a user interface to display the automatic transfer of funds. In embodiments:

the financial product is a loan, and where the loan amount, interest rate, and repayment schedule are determined based on the trajectory of best fit;

the plurality of users is greater than 1000 users, and wherein obtaining time-dependent financial data for the plurality of users between a first time and a second time comprises obtaining daily data for a period of at least one week;

the number of trajectories is at least 10 times fewer than the number of users;

the user account is a mobile money account associated with a mobile account;

the financial product is further determined based on telecom data pertaining to the new user;

the time-dependent financial data for a plurality of users comprises data for a plurality of financial variables, and wherein the algorithm is applied separately to each of the plurality of financial variables;

the user interface is on a user device associated with the new user, and wherein the method further comprises transmitting a message to the user device, the message configured to alter the user interface to indicate the determined financial product and an electronic funds transfer status;

the financial product is a loan, and where the loan amount, interest rate, and repayment schedule are determined based on the trajectory of best fit, and the number of trajectories is at least 10 times fewer than the number of users;

the user account is a mobile money account associated with a mobile account, and the financial product is further determined based on telecom data pertaining to the new user;

the user interface is on a user device associated with the new user, and wherein the method further comprises transmitting a message to the user device, the message configured to alter the user interface to indicate the determined financial product and an electronic funds transfer status, and the number of trajectories is at least 10 times fewer than the number of users;

the user interface is on a user device associated with the new user, and wherein the method further comprises transmitting a message to the user device, the message configured to alter the user interface to indicate the determined financial product and an electronic funds transfer status, and the financial product is a loan, and where the loan amount, interest rate, and repayment schedule are determined based on the trajectory of best fit; and the user interface is on a user device associated with the new user, and wherein the method further comprises transmitting a message to the user device, the message configured to alter the user interface to indicate the determined financial product and an electronic funds transfer status, and the user account is a mobile money account associated with a mobile account, and the financial product is further determined based on telecom data pertaining to the new user.

In aspects is a system comprising: a processor; a memory coupled to the processor, the memory configured to store program instructions for instructing the processor to carry out the methods as above. In embodiments, the system further comprises a trajectory module configured to apply the GBTM algorithm to determine the plurality of first financial variable trajectories. In embodiments, the system further comprises a trajectory comparison module configured to compare the set of first financial variable time-dependent data for the new user to determine the best fitting trajectory from the plurality of first financial variable trajectories.

These and other aspects of the invention will be apparent to one of skill in the art from the description provided herein, including the examples and claims.

DETAILED DESCRIPTION OF VARIOUS EMBODIMENTS

Figure 1:
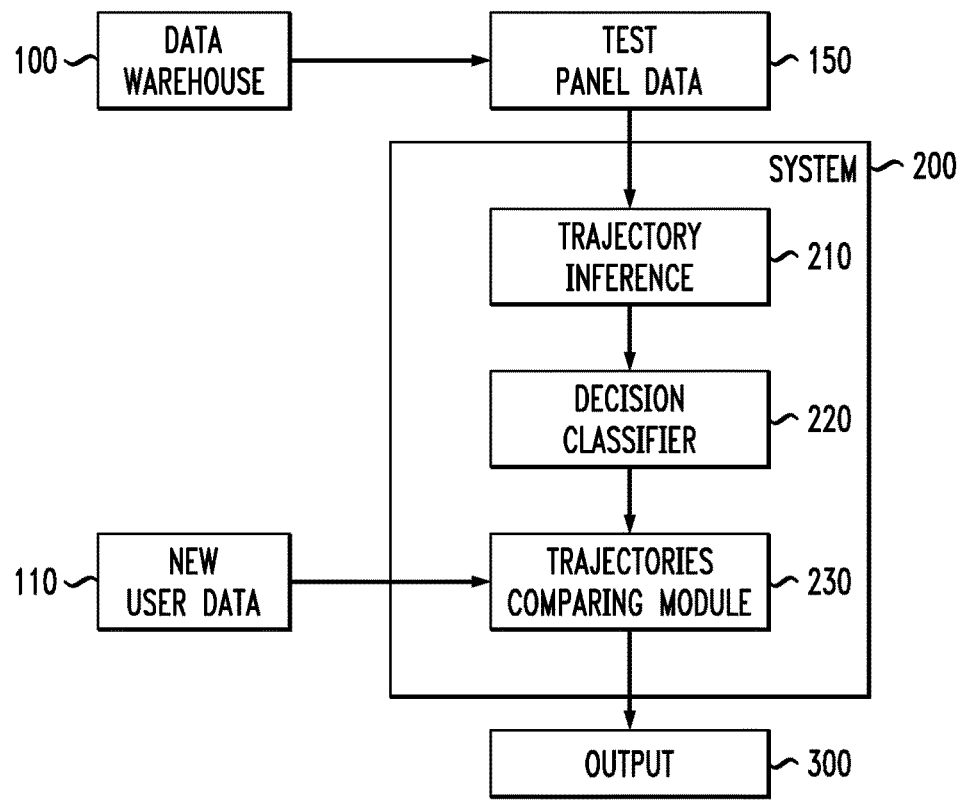
FIG. 1 provides a flow chart showing data processing by a system according to an aspect of the invention.

In an aspect is a method for processing financial information comprising: applying a group-based trajectory model (GBTM) algorithm to time-dependent financial data for a first financial variable for a plurality of users to determine a plurality of first financial variable trajectories; for a set of first financial variable time-dependent data for a new user, determining a best fitting trajectory from the plurality of first financial variable trajectories; transmitting a message, via a distributed network, to a user device associated with the new user or to a provider device associated with a provider, the message comprising content determined at least in part by the best fitting trajectory, the message configured to alter a user interface of the user device or provider device to display the content, wherein the content comprises an offer for a financial product, and wherein at least one variable pertaining to the financial product is determined at least in part by the best fitting trajectory.

In an aspect is a method comprising: obtaining time-dependent financial data for a plurality of users between a first time and a second time; applying an algorithm to reduce the time-dependent financial data for a plurality of users to a plurality of representative trajectories; obtaining time-dependent financial data for a new user between the first time and the second time; comparing time-dependent financial data for the new user with the trajectories, and identifying the trajectory of best fit; determining a financial product for the new user at least in part based on the trajectory of best fit; automatically executing an electronic fund transfer into a user account associated with the new user based on the determined financial product; and altering a user interface to display the automatic transfer of funds.

In aspects are system(s) configured to carry out the methods described herein. The system comprises a processor and a memory coupled to the processor, the memory configured to store program instructions for instructing the processor to carry out the method. The systems may further comprise additional components, including multiple processors, multiple independent memories, and the like, and that any suitable system architecture (e.g., localized, cloud-based, etc.) may be used. Further details are provided herein. It will be appreciated, however, that certain components of such systems, and further certain steps of the associated methods, may be omitted from this disclosure for the sake of brevity. The omitted components and steps, however, are merely those that are routinely used in the art and would be easily determined and implemented by those of ordinary skill in the art using nothing more than routine experimentation. Throughout this specification, where hardware is described, it will be assumed that the devices and methods employing such hardware are suitably equipped with necessary software (including any firmware) to ensure that the devices/methods are fit for the described purpose. It is the case that implementation of the methods and systems herein, including development of any necessary and accompanying components (whether described herein or omitted), will be achievable by one skilled in the art based on this disclosure in the context of commonly available information.

Throughout this disclosure the term "panel data" is used to refer to data collected about a specific variable (e.g., savings account balances or the like) over a period of time. That period of time may range from a few days to several years or more, and specifically may be in the range of 5-1500 days, or 1-12 months, or 1-6 months, or 3-6 months, or another appropriate range. Panel data may be obtained from more than one variable and the timeframe for data collection may be similar or independently selected for each variable.

Throughout this disclosure, there are discussed "providers" and "users." A provider is an entity such as a corporate, government, or other entity that offers products to user. Particularly, the provider is a financial services provider such as a banking entity or the like, and a user is a customer of the provider. Throughout this disclosure, a "new user" is meant to be a user that may be offered a product by the provider based on one or more analysis or analyses carried out as described herein. A "new user" may be a user that has not previously been offered a product or may be a user that has been previously offered products and is now in consideration for a new product offer.

The GBTM, in embodiments, takes panel data and creates a preselected number of trajectories that model the data. For example, from panel data for "y" different users having "y" individual bank accounts (i.e., users each having a savings account), and the savings account balances measured periodically (e.g., daily, or every other day, etc.) over a specific period of time (e.g., 1, 2, 4, 8, or 12 weeks, or 1, 2, 3, 6, or 12 months, or 1, 2, or 3 years, or more than 3 years), the algorithm generates a number "k" of model trajectories. In embodiments, the number of users providing the test panel data is at least 500, 1000, 2000, 3000, 5000, or 10000 users. In embodiments, the number of trajectories "k" is determined by the provider and may be 5, 10, or 15, or any other specifically desired number, or in the range of 2-20, or 2-10, or 3-10, or 4-15, or 5-15, or the like. In embodiments, the number of trajectories is at least 10 times fewer (or 20, 30, 40, or 50 times fewer) than the number of users from which the test panel data is derived. The accuracy of the model is dependent on the value selected for k, and various algorithms (e.g., meta analysis) can be used to determine the optimal value of k for a given set of data. Furthermore, the panel data can be updated with new data and the k trajectories recalculated with the GBTM algorithm. This updating can occur for every addition of data to the panel data, or at predetermined intervals.

Throughout this disclosure, two types of data are described—"test panel data" (which may, in instances herein, be simply referred to as "panel data") and "new user panel data". The test panel data is data that is used by a provider (e.g., a banking entity) to generate the k trajectories by the GBTM algorithm, whereas the new user panel data is data obtained for a new user and that is fit to one or more of the k trajectories calculated from the test panel data, for example in order to predict one or more characteristics about the new user or to determine a suitable financial product for the new user.

In embodiments, the test panel data may be savings account balances for a plurality of users each having a savings account. The GBTM model is used on test panel data in order to identify k trajectories that are likely to be applicable to a new user. Accordingly, in embodiments, the panel data is selected from a demographic or set of test users that share characteristics with a likely new user. For example, the test panel data may be identified from users having a specific level of reported income, or a specific location for a home address, or the like. The users can be actual users of a provider (i.e., a banking entity) and the data can be actual account balances from the provider's records. Alternatively, the panel data can be aggregated from a plurality of providers. If necessary, the data can be suitably anonymized. In addition or in the alternative to savings account balances, other variables can be used. For example, data can be the frequency a user logs into an account, or the frequency of changes (deposits and/or withdrawals) in an account, or the like, provided that the data shows activity (or a lack of activity) over time.

All data used by the system can be housed in a single location, or can be stored in a non-localized (e.g., cloud) fashion. Herein, a collection of panel data and, optionally, other types of data may be stored in a data warehouse. The data warehouse may be maintained and operated by the provider, in embodiments. In embodiments, telecom data is not stored within the data warehouse but is accessible to the provider (i.e., to a server operated by the provider) such as via a distributed network.

In addition to the test panel data, other data may be used to improve the accuracy of the test panel data. Examples of such data include telecom data (e.g., for telecom users having a prepaid account, the balance of the account, or call records), mobile money data (e.g., balances in a mobile wallet or other mobile money account), or the like. In other embodiments and where appropriate, static data (i.e., data that is not recorded at intervals over time) may be used in order to improve accuracy.

For a new user, such as a new user desiring a financial product, new user panel data can be obtained. In embodiments, such data may be financial time-dependent data, such as savings account balances over time, or the like. In embodiments, "x" types of data (where "x" may be 1, 2, 3, 4, 5, or more than 5) are gathered pertaining to the new user (e.g., a plurality of financial time-dependent data types), and the time-dependent data for each type of data is compared to the k trajectories that are determined using the GBTM applied to test panel data for that type of data. Using the single example of savings account balance as representative, the system obtains savings account balances over a period of time from the new user's savings account. The resulting new user panel data is compared to the k trajectories that are determined by the system for test panel data. The trajectory of best fit to the new user panel data is selected and used by the system as described herein. In addition or in the alternative to savings account balance, other types of data can be used: an outstanding credit balance, a credit capacity, a length of credit history, a number of deposits, a number of withdrawals a number of loans, a number of repayments, a number of balance queries an amount of interest earned over time, an amount of largest deposit, an amount of largest withdrawal, an average deposit, or an average withdrawal, or combinations thereof.

Panel data can be obtained in any convenient way and from any suitable source. For example, batch data can be obtained from pre-existing data stores and used as panel data with modifications if necessary. Modifications include altering the formatting of the data, augmenting the data with additional data from a separate database or collected specifically for the task, anonymizing the data, or the like. Also for example, panel data can be created for a provider by aggregating data from a variety of sources by a third party or by the provider itself. Also for example, panel data can be created afresh by a provider, e.g., by initiating data collection over a predetermined period of time and for a selected group of users. All of the panel data can be formatted and stored in any convenient data structure such as a database or the like. Receipt and processing of panel data according to the processes herein can be fully or partially automated.

New user panel data can be obtained in any convenient way and from any suitable source. For example, the new user panel data can be obtained from the user him/herself, e.g., in the form of a questionnaire or the like. New user panel data can be obtained from a previous provider to which the user has/had a relationship, e.g., a prior lending or banking institution. New user panel data can be obtained from a credit tracking institution or some other third party (e.g., telecom providers, etc.) with access to data of this nature. New user panel data can be obtained/generated directly by the provider as new data, e.g., by creating a "trial period" during which the new user is monitored for the express purpose of utilizing the systems and methods herein. New user panel data can be formatted specifically in order to be compatible with the systems and methods herein, and may be stored in any convenient data structure such as a database or the like. Receipt and processing of new user panel data can be fully or partially automated. For example, a new user can indicate a previous banking institution and the system then automatically queries, receives, and processes (according to the methods herein) the data from the banking institution.

In order to determine the trajectory of best fit for new user panel data, the systems herein comprise a trajectory comparison module. In embodiments, for example, the trajectory comparison module is configured to compare the set of first financial variable time-dependent (panel) data for the new user to determine the best fitting trajectory from the plurality of first financial variable trajectories determined from test panel data.

In embodiments, the new user panel data is compared to trajectories determined by the system using the GBTM algorithm, and the new user is characterized according to such comparison. Based on the characterization, the provider automatically determines at least one variable pertaining to a product that can be offered to the new user. The variable may be further modified based on other data from the data warehouse, including comparison of other types of data pertaining to the new user with trajectories determined from test panel data. A plurality of variables may be determined in this manner, if desired. The system may further automatically determine a specific product or a class of products that can be offered to a new user based on the analysis of new user panel data. In embodiments, the financial product is a loan and the at least one variable is selected from a loan amount, an interest rate, and a repayment schedule.

In embodiments, the output of group based trajectory models provides two fundamental results for the systems and methods herein. First, for each group a trajectory is provided. This trajectory is a smooth, low-order polynomial that attempts to capture the savings or transaction behaviour (for example) of the customers in that group over time. Simple examples include generally increasing, generally decreasing, peaking and then falling off, etc. Second, each customer is given a probability of being included in (or belonging to) one of the k trajectories. This group membership is similar to customer segmentation but arrived at through the trajectory analysis of longitudinal data. These two outputs from GBTM models are then used as input into the systems and methods for creating more accurate credit scores on high-frequency micro loans.

Once the system determines the at least one variable, the system generates a message. The message is configured to cause one or more actions as described in more detail herein. In embodiments, the message is transmitted to a provider device or an output component of the provider system. In embodiments, the message is transmitted to a user device, the user device comprising a user interface. In embodiments the message may be transmitted to a third party (i.e., not the user and not the provider). Combinations of recipients are also allowed. In embodiments, the message is automatically generated and has a format that is compatible with the recipient device/system. In embodiments, the content of the message may comprise a characterization of the new user based on the determined best fitting trajectory, and may further comprise other information (e.g., identity information about the user and/or the provider, historical information about the user and/or provider, information about the product on offer, information about the method used to determine the product, etc.).

In embodiments, the message is configured to cause one or more actions. Such actions include: altering the user interface of a user device or a provider device to indicate (e.g., display, vocalize, print, or otherwise output) the determined financial product and/or the determined at least one variable; initiate an automatic funds transfer to a user account from an account of the provider; indicate an electronic funds transfer status; transfer money to a user account; and the like. In embodiments, the user account is a bank account or, alternatively, a mobile money account associated with a mobile account.

The systems and methods herein are intended to include a user device. The user device may be a mobile device such as a mobile phone, tablet, or the like, or a desktop computer in some cases. The user device contains a communications module. The communication module is configured to interface with the distributed network with which the server and any other components of the system is/are also in communication. In this way the user device is in communication with the server and any other components of the system herein, and the user device can receive output from the server. Such reception can be in real time—e.g., the connections with the network are continuous and the user device receives messages without any significant time delay. Such reception can alternatively be delayed—e.g., where the user device is temporarily out of communication with the network, the output is received at a time when the user device re-establishes such communication. The systems herein also involve a provider device (e.g., a server, desktop computer, node within a system of networked nodes, etc.). Herein, the user device and provider device may be referred to collectively or individually as a recipient device, particularly where one or both of these devices are recipients of a message as described herein.

The user device contains a user interface such as a graphical user interface (GUI) or, in some cases where necessary, an audio-only user interface or some other type of user interface as known in the field. The user interface is configured to be modified by the output of the server (e.g., by the message sent by the server). The modification can be temporary (e.g., for a single viewing such as by delivery of a text message to the user) or can be long-lasting (e.g., present every time the user accesses the GUI, such as modifying the user's account to include a new product, account, or the like, and modifying the user's GUI accordingly to show that modification to their account). The modification can be interactive, such as where the modification is the result of a message containing instructions for a question/answer session with the user. This is particularly suitable where the output seeks further input from the user, such as an acceptance of a new product. For an interactive message from the server, the methods can further include establishing a connection with the user device and transferring data between the server and the user device (e.g., via a USSD connection or the like).

An additional or alternative output of the systems and methods herein is automatic initiation of any one or more of the following: an electronic process for delivering a product to the user; an electronic process for delivering a service to the user; an advertisement for a product or service configured for delivery and display on the user device; modification of a product or service for the user (either backend modification, user-level modification, or a combination thereof); modification of a product or service generally for all users; modification of the user's account information or status; or the like. For example, the output can automatically initiate a change to the user's account with the provider, such as changing the credit score of the user, or changing the credit limit of the user, or the like.

An additional or alternative output of the systems and methods herein is a predictive model or improvements in predictive models. An example of this method is to put temporal data from a customer into the system and get a more accurate credit score for the individual out. Then, this can be done on a larger sample of customers, with temporal data for thousands, tens of thousands, or hundreds of thousands of customers. In such a way a more accurate model would emerge. Therefore, in embodiments, the model that comes out of this process is also a useful output.

The systems and methods herein further involve coordinating reconfiguration of the recipient device based on the offer for a financial product. The reconfiguration of the recipient device involves any combination of the following: changing a setting in the device; altering a user interface of the recipient device to display one or more variables about the offered financial product (e.g., status of the offer, status of an accepted product, outstanding balance, payments made, credit available, and the like); altering an application stored in a memory of the recipient device (e.g., to display a new field, the new field related to the offered financial product, such as a new field for an outstanding balance, payments made, credit available, and the like); set an alert schedule to provide scheduled reminders (e.g., visual or audible alerts, email reminders, SMS reminders, etc.) to the user or provider; and updating a profile of the user on the provider device. In embodiments the reconfiguration is a non-volatile change to the device, such as a change to a setting that will affect the device until such time as the setting is changed again.

Data and information may be communicated between a user device and a server. The server may be, for example, located with the provider—such as with a bank or other financial entity. Alternatively or in addition, a remote server not located at the provider, or even a cloud computing architecture, or any combination of such embodiments, may be used as appropriate. Communications may be carried out via a distributed network. Any such suitable network now known or later developed may be used. Examples of such networks include GSM, 3G, 4G, EDGE, WiFi, Bluetooth, mesh, or other networks may be suitable. The distributed network can be used, for example, to receive new user panel data by the server, to receive test panel data by the server (e.g., from a variety of banking entities and/or user devices), to transmit messages from the server to a user device, or the like.

Financial transaction data (payments, transfers, savings, balance queries, etc.) across many users over time create very rich panel (longitudinal) data sets. For example, panel data provides insights into cyclical financial behavior that is critical when observing users between regularly scheduled in-flows and out-flows. Conventional summary statistics (i.e., daily or monthly means, maximums, minimums) fail to capture this information. More accurate credit scoring allows financial institutions to issue products such as micro-loans at more competitive rates.

An advantage of the processes herein is the ability to summarize complex temporal patterns in financial behaviour, and to use such summarizing to improve financial products on offer. For example, the particular application to short-term micro-loans is important. These settings have a payback period of <6 months (compared to multiple years of more traditional loans). Therefore being able to identify temporal patterns in this short time scale is important to calculating more accurate credit scores and limits.

Various embodiments of the invention are described more fully hereinafter with reference to the accompanying drawings. The invention herein may be embodied in many different forms and should not be construed as limited to the embodiments set forth in the drawings; rather, these embodiments are provided to provide further illustrative non-limiting examples. Arrowheads in the figures are provided merely as examples of directions for the flow of data but are not exhaustive and are not meant to be limiting—i.e., data may flow (where appropriate) in directions that are not shown by arrowheads in the figures. Similar numbers in different figures are meant to refer to similar components.

With reference to FIG. 1, there is shown a flow chart showing data processing by a system according to an aspect of the invention. System 200 is shown as receiving test panel data 150. The test panel data is obtained from data warehouse 100, which itself may be a standalone database as shown or may be a component part of system 200 (although such embodiment is not shown). Test panel data 150 may optionally be identified from a larger set of data. Within system 200 is trajectory inference module 210, which identifies k trajectories from the panel data. Furthermore within system 200 is decision classifier 220, which assigns trajectories to customers who were a part of the original panel data obtained from data warehouse 100. In this way original panel data are checked by the model that emerges from the analysis. That is, decision classifier 220 determines the types of data within the test panel data, each type of data being subjected to GBTM analysis to determine the k trajectories. System 200 also receives new user data 110, which data may be stored in the data warehouse 100 or may be stored on a user device or elsewhere. The new user data is panel data and is compared to the trajectories using trajectories comparing module 230. In embodiments, new user data 110 is treated distinctly from test panel data because such data are not subjected to decision classifier 220 but are rather directly compared with determined trajectories.

The system 200 identifies a trajectory of best fit and then determines a product and/or a variable based on the trajectory of best fit, which identification is used to create output 300.

Figure 2:
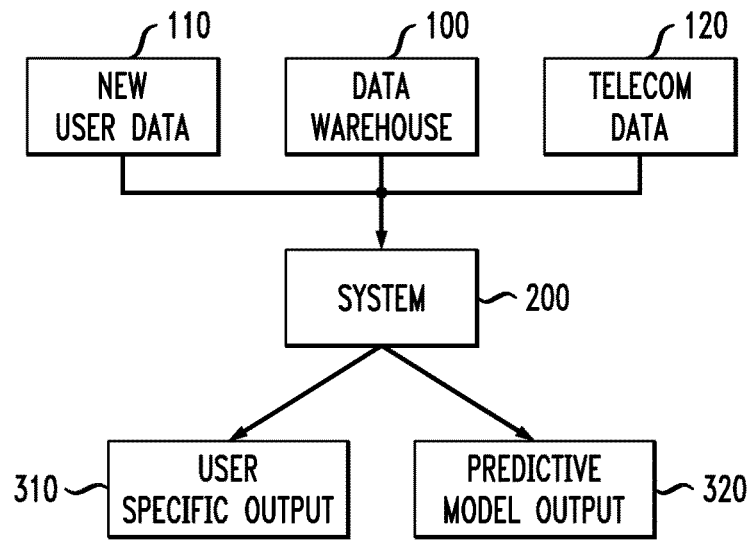
FIG. 2 provides a flow chart showing data input and output according to an aspect of the invention.

With reference to FIG. 2, there is shown a flow chart showing data input and output according to an aspect of the invention. System 200 receives data from three sources (which sources may be independent or which may overlap, in various embodiments): new user data 110, data warehouse 100, and telecom data 120. From these data, two types of output are prepared: user specific output 310 and predictive model output 320.

Figure 3:
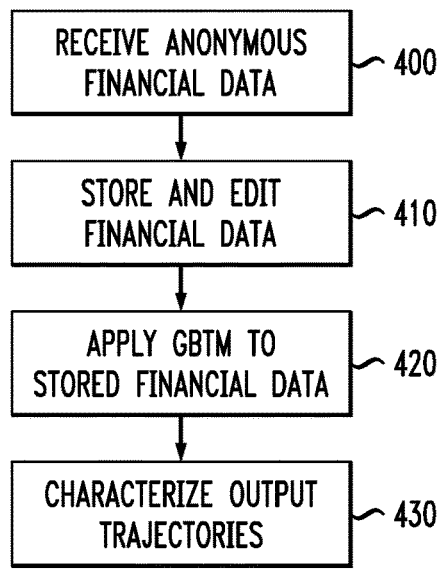
FIG. 3 provides a set of steps for carrying out processing of historical data according to an aspect of the invention.

With reference to FIG. 3, there is provided a set of steps for carrying out an aspect of the methods disclosed herein. In the method, a provider server or another suitable device receives (e.g., via a distributed network) anonymous financial data (400) pertaining to a financial variable such as those described herein. The data is received from internal sources (e.g., from a server associated with the same provider as the server carrying out the analysis) or from an external provider. The data is historical data and is sourced from a plurality of customers (users) over a period of time. The system stores such data (410) in a database, which storage may involve, where necessary, reconfiguration and/or reformatting (i.e., editing) of the data so as to be compatible with later algorithms and processes carried out by the system. The editing of the data may further comprise automatically or manually selecting a subset of the original data received, particularly where the received data includes data that is not needed or not relevant to the later algorithms. The system then applies GBTM to the stored (and, where appropriate, edited) data (420). The output of the GBTM calculations is a number of trajectories, and the system characterizes (i.e., classifies) the output trajectories (430).

Figure 4:
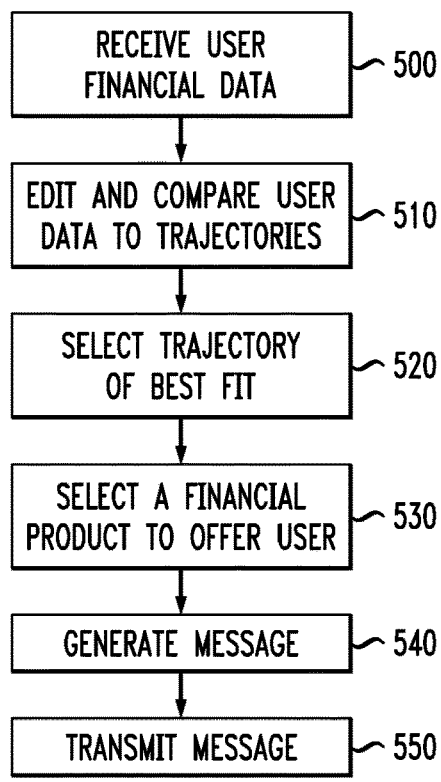
FIG. 4 provides a set of steps for carrying out processing of user data according to an aspect of the invention.

With reference to FIG. 4, there is provided a set of steps for carrying out an aspect of the methods disclosed herein. In the method, user financial data is received (500) by a provider system or a third-party system contracted by the provider. The system optionally edits the user data (e.g., to select a subset of the data, such as a specific time period, or to exclude irrelevant data, or to exclude outlier data, etc.) and then compares the user data (510) to the trajectories determined as output from the GBTM algorithm on historical data. The system selects a trajectory that best fits the user data (520). The system then selects, based on the determined trajectory, a financial product to offer to the user (530). The system then generates a message based on the selected financial product on offer (540), and transmits the message (550) either to a user device or to a provider device.

Figure 5:
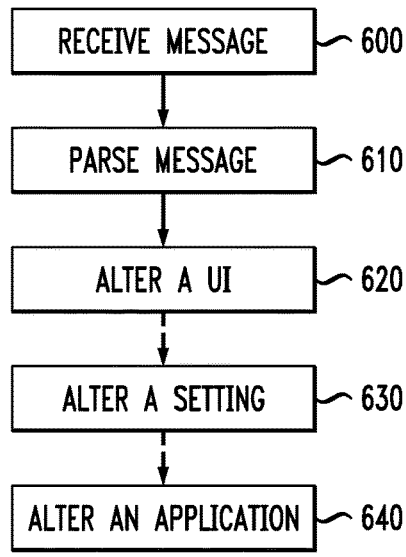
FIG. 5 provides a set of steps for processing a message according to an aspect of the invention.

With reference to FIG. 5, there is provided a set of steps for carrying out an aspect of the methods disclosed herein. In the method, a recipient device (i.e., either a user device or a provider device) receives a message (600) via a distributed network, such as via a LAN or WiFi or cellular network. The device parses the message (610) and extracts various components of the message (e.g., instructions for carrying out an alteration to the device). In embodiments, the message then causes the device to alter a User Interface (620), such as by displaying an alert or the like. In embodiments, the message alternatively (or in addition) causes the device to alter a setting of the device (630), such as by automatically creating a schedule of alerts to be transmitted to the user through a UI. In embodiments, the message alternatively (or in addition) causes the device to alter an application (640) stored/operable on the device, such as by reformatting a banking application to display various data pertaining to the financial product.

Throughout this disclosure, use of the term "server" is meant to include any computer system containing a processor and memory, and capable of containing or accessing computer instructions suitable for instructing the processor to carry out any desired steps. The server may be a traditional server, a desktop computer, a laptop, or in some cases and where appropriate, a tablet or mobile phone. The server may also be a virtual server, wherein the processor and memory are cloud-based.

The methods and devices described herein include a memory coupled to the processor. Herein, the memory is a computer-readable non-transitory storage medium or media, which may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Throughout this disclosure, use of the term "or" is inclusive and not exclusive, unless otherwise indicated expressly or by context. Therefore, herein, "A or B" means "A, B, or both," unless expressly indicated otherwise or indicated otherwise by context. Moreover, "and" is both joint and several, unless otherwise indicated expressly or by context. Therefore, herein, "A and B" means "A and B, jointly or severally," unless expressly indicated otherwise or indicated otherwise by context.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
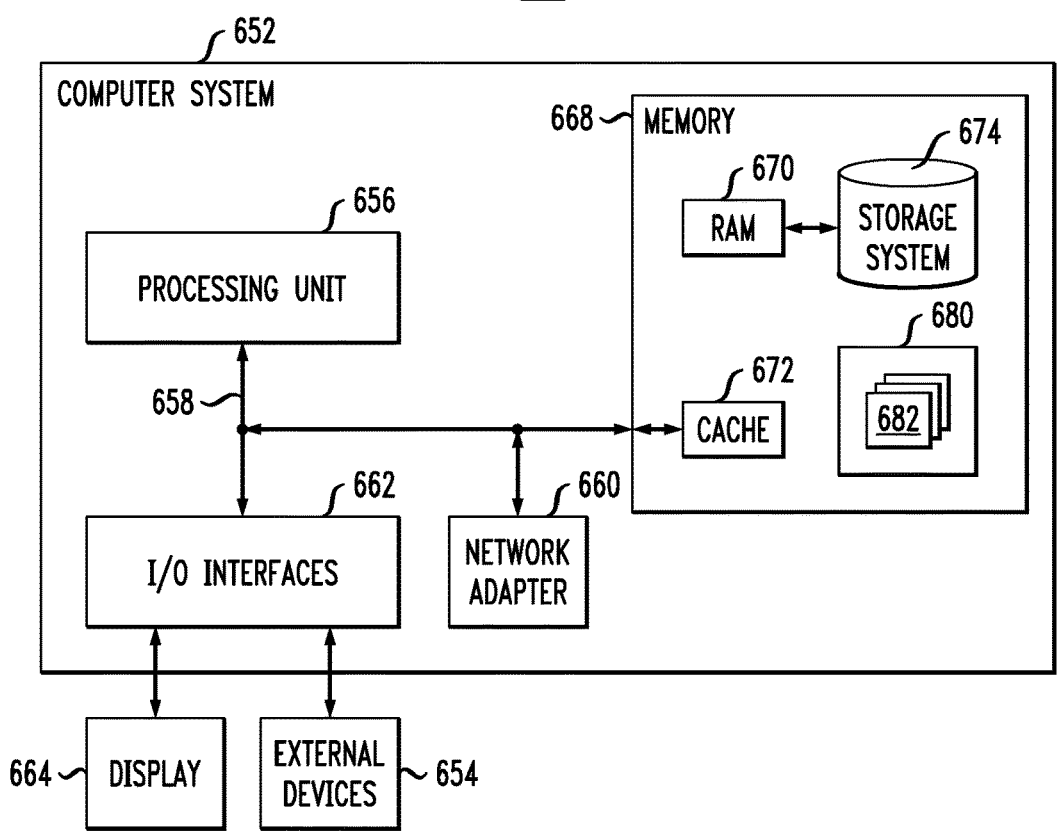
FIG. 6 illustrates a computer system in accordance with which one or more components/steps of the techniques of the invention may be implemented according to an aspect of the invention.

One or more embodiments can make use of software running on a general-purpose computer or workstation. With reference to FIG. 6, in a computing node 650 there is a computer system/server 652, which is operational with numerous other general purpose or special purpose computing system environments or configurations. Examples of well-known computing systems, environments, and/or configurations that may be suitable for use with computer system/server 652 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 652 may be described in the general context of computer system executable instructions, such as program modules, being executed by a computer system. Generally, program modules may include routines, programs, objects, components, logic, data structures, and so on that perform particular tasks or implement particular abstract data types. Computer system/server 652 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 652 in computing node 650 is shown in the form of a general-purpose computing device. The components of computer system/server 652 may include, but are not limited to, one or more processors or processing units 656, a system memory 668, and a bus 658 that couples various system components including system memory 668 to processor 656.

The bus 658 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 652 typically includes a variety of computer system readable media. Such media may be any available media that is accessible by computer system/server 652, and it includes both volatile and non-volatile media, removable and non-removable media.

The system memory 668 can include computer system readable media in the form of volatile memory, such as random access memory (RAM) 670 and/or cache memory 672. The computer system/server 652 may further include other removable/non-removable, volatile/nonvolatile computer system storage media. By way of example only, storage system 674 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 658 by one or more data media interfaces. As depicted and described herein, the memory 668 may include at least one program product having a set (e.g., at least one) of program modules that are configured to carry out the functions of embodiments of the invention. A program/utility 680, having a set (at least one) of program modules 682, may be stored in memory 668 by way of example, and not limitation, as well as an operating system, one or more application programs, other program modules, and program data. Each of the operating system, one or more application programs, other program modules, and program data or some combination thereof, may include an implementation of a networking environment. Program modules 682 generally carry out the functions and/or methodologies of embodiments of the invention as described herein.

Computer system/server 652 may also communicate with one or more external devices 654 such as a keyboard, a pointing device, a display 664, etc., one or more devices that enable a user to interact with computer system/server 652, and/or any devices (e.g., network card, modem, etc.) that enable computer system/server 652 to communicate with one or more other computing devices. Such communication can occur via Input/Output (I/O) interfaces 662. Still yet, computer system/server 652 can communicate with one or more networks such as a local area network (LAN), a general wide area network (WAN), and/or a public network (e.g., the Internet) via network adapter 660. As depicted, network adapter 660 communicates with the other components of computer system/server 652 via bus 658. It should be understood that although not shown, other hardware and/or software components could be used in conjunction with computer system/server 652. Examples, include, but are not limited to: microcode, device drivers, redundant processing units, external disk drive arrays, RAID systems, tape drives, and data archival storage systems, etc.

It is understood in advance that although this disclosure includes a detailed description on cloud computing below, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Computing node 650 in FIG. 6 can be an example of a cloud computing node. Computing node 650 is only one example of a suitable cloud computing node and is not intended to suggest any limitation as to the scope of use or functionality of embodiments of the invention described herein. Regardless, computing node 650 is capable of being implemented and/or performing any of the functionality set forth hereinabove. It is also to be understood that computing node 650 is not necessarily a cloud computing node.

Figure 7:
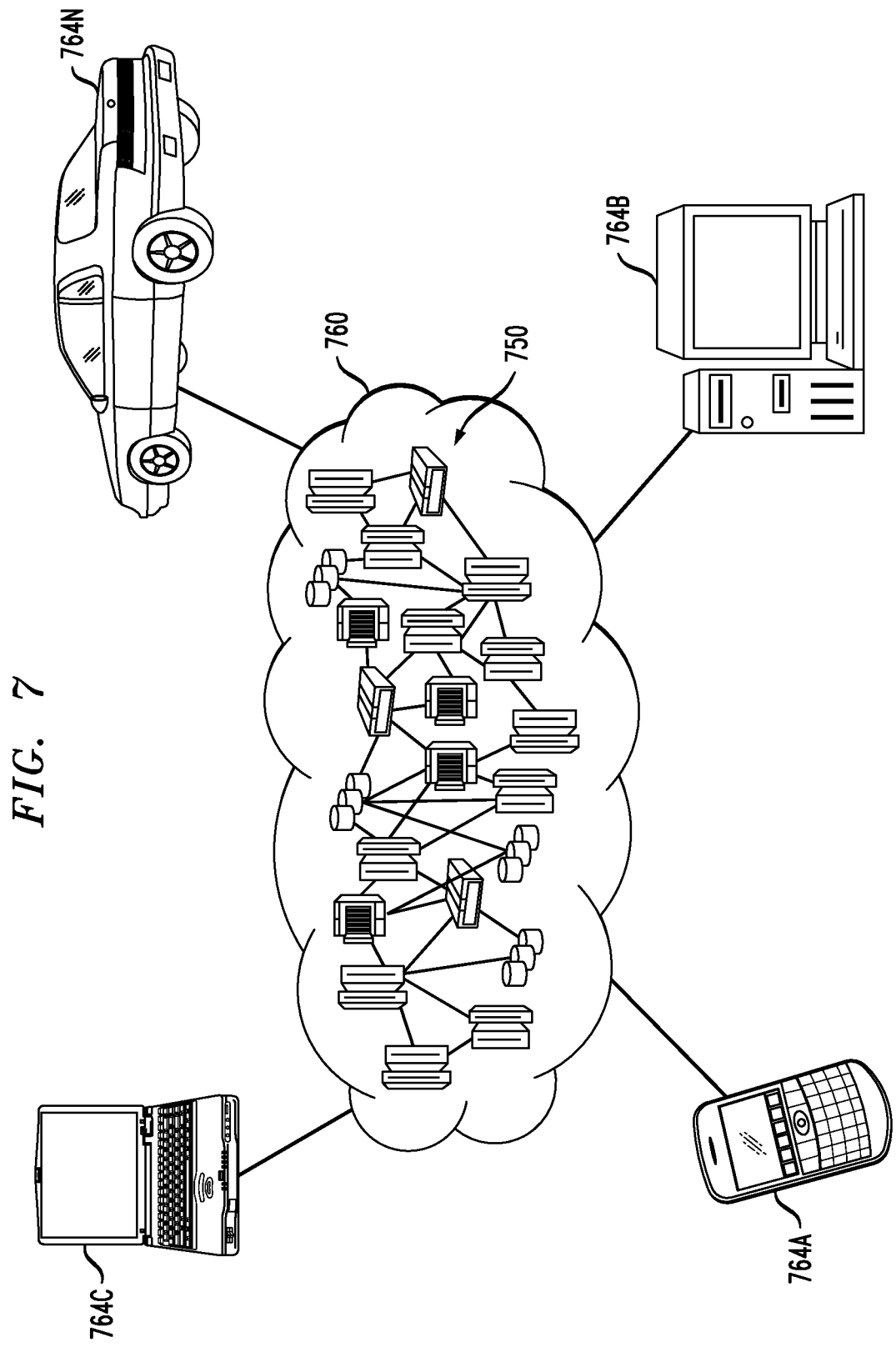
FIG. 7 depicts a cloud computing environment according to an aspect of the invention.

Referring now to FIG. 7, illustrative cloud computing environment 760 is depicted. As shown, cloud computing environment 760 comprises one or more cloud computing nodes 750 with which local computing devices used by cloud consumers, such as, for example, a wearable device (not explicitly shown), a personal digital assistant (PDA) or cellular telephone 764A, desktop computer 764B, laptop computer 764C, and/or automobile computer system 764N may communicate. Nodes 750 may communicate with one another. They may be grouped (not shown) physically or virtually, in one or more networks, such as Private, Community, Public, or Hybrid clouds as described hereinabove, or a combination thereof. This allows cloud computing environment 760 to offer infrastructure, platforms and/or software as services for which a cloud consumer does not need to maintain resources on a local computing device. It is understood that the types of computing devices 764A-N shown in FIG. 7 are intended to be illustrative only and that computing nodes 710 and cloud computing environment 760 can communicate with any type of computerized device over any type of network and/or network addressable connection (e.g., using a web browser).

Figure 8:
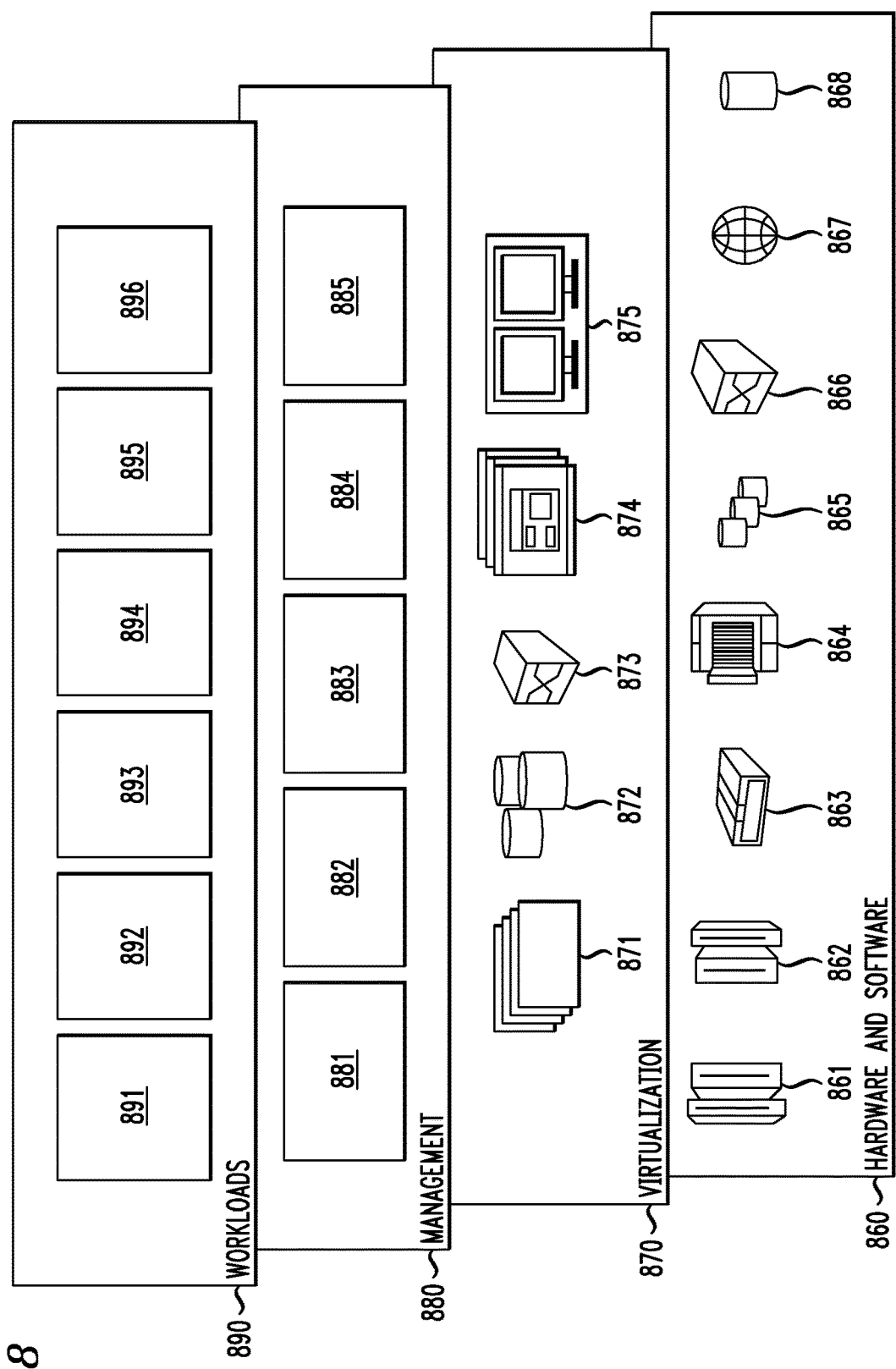
FIG. 8 depicts abstraction model layers according to an aspect of the invention.

Referring now to FIG. 8, a set of functional abstraction layers provided by cloud computing environment 760 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and financial information processing 896, which may implement the functionality described above with respect to FIGS. 1-8.

It is to be understood that while the invention has been described in conjunction with examples of specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. The pertinent parts of all publications mentioned herein are incorporated by reference. All combinations of the embodiments described herein are intended to be part of the invention, as if such combinations had been laboriously set forth in this disclosure.

EXAMPLES

In an example, records are made available for each individual user over a long period of time, such as one year. With such panel data, trajectories are created that depict the various trends such as savings behavior, frequency of transactions and ability to take loans.

With such trends in place, data from a new user is obtained and characterized into several major categories using a trajectory inference that classifies scattered records into x-number of major trends.

These trajectories may fit to certain archetypes. For example, large monthly deposits suggest a salaried worker whereas infrequent use may suggest a day-laborer. Seasonal activity may be associated with rural agriculture. Large withdrawals in certain months may suggest payment for school fees.

With such trends in place, for a new user with a defined set of characteristics the trend in which the new user falls is predicted. With such a trajectory score combined with other credit scoring attributes, an accurate credit score is provided for the new user.

An example analysis is $P(Y)=\text{Sum}(\pi(x)P(Y))$. The term "savings amount" is used in the example below, but other metrics over time would work as well. The distribution (trajectory) of customer i's savings ($Y_i$) is described over time (or age of customer i). This is $P(Y_i|Age_i)$. It is assumed that these distributions come from a (possible) mixture of J different distributions (i.e., trajectories). For example, if J=2, then two trajectories are available for comparison against the customer's temporal data. The distribution $P(Y_i|Age_i)$ is analysed through the likelihood of J different possibilities. That is:

$$P(Y_i | Age_i) = \sum_{j=1}^{J} \pi^j * P(Y_i | Age_i, j; \beta^j)$$

Where:

j is indexing over the possible J trajectories;

$\pi^j$ is probability that the customer belongs to trajectory j; and the last term (ß) is the probability that distribution j actually resulted in the $Y_i$ time series that was observed.

The invention claimed is:

1. A method for processing financial information comprising:
    retrieving time-dependent financial data for a first financial variable for a plurality of users;
    analyzing values of the time-dependent financial data for each user of the plurality of users, wherein the values are periodically measured over a predetermined period of time;
    identifying a plurality of first financial variable trajectories based on the analyzing, wherein the plurality of first financial variable trajectories comprise expressions of financial-based behavior of respective groups of the plurality of users over the predetermined period of time;
    for a set of first financial variable time-dependent data for a new user, determining a best fitting trajectory from the plurality of first financial variable trajectories;
    automatically generating at least one message configured to cause execution of one or more tasks on a recipient device selected from a user device associated with the new user and a provider device associated with a provider, wherein the at least one message has one or more formats compatible with the recipient device and the provider device; and
    transmitting the at least one message, via a distributed network, to the recipient device, the at least one message comprising content determined at least in part by the best fitting trajectory;
    wherein the one or more tasks comprise:
        a modification of a user interface of the recipient device to display the content, wherein the content comprises an offer for a financial product, and wherein at least one variable pertaining to the financial product is determined at least in part by the best fitting trajectory; and
        a modification of the user interface of the recipient device to display the at least one variable; and
        an alteration of an application stored in a memory of the recipient device to display a new field related to the financial product.

2. The method of claim 1, wherein the one or more tasks are configured to result in a non-volatile change to the recipient device and further comprise at least one of: a change in a setting in the recipient device; an automatic configuration of an alert schedule to provide scheduled reminders to the new user or to the provider; and an updating of a profile of the new user on the provider device.

3. The method of claim 1, wherein the first financial variable is selected from a savings account balance, an outstanding credit balance, a credit capacity, a length of credit history, a number of deposits, a number of withdrawals, a number of loans, a number of repayments, a number of balance queries, an amount of interest earned over time, an amount of largest deposit, an amount of largest withdrawal, an average deposit, and an average withdrawal.

4. The method of claim 1, wherein the plurality of first financial variable trajectories comprises between 2 and 10 trajectories.

5. The method of claim 1, further comprising:
    retrieving additional time-dependent financial data for a plurality of additional financial variables for the plurality of users;
    analyzing values of the additional time-dependent financial data for each user of the plurality of users, wherein the values of the additional time-dependent financial data are periodically measured over a predetermined period of time; and identifying a plurality of additional financial variable trajectories for each of the plurality of additional financial variables based on the analyzing of the values of the additional time-dependent financial data.

6. The method of claim 5, further comprising determining best fitting trajectories for each of the plurality of additional financial variables for the new user from the plurality of additional financial variable trajectories for each of the plurality of additional financial variables.

7. The method of claim 1, wherein the message is transmitted to the provider device and wherein the content further comprises characterization of the new user based on the best fitting trajectory.

8. The method of claim 1, wherein the at least one variable is selected from a loan amount, an interest rate, and a repayment schedule.

9. A system comprising:
a processor;
a memory coupled to the processor, the memory configured to store program instructions for instructing the processor;
to retrieve time-dependent financial data for a first financial variable for a plurality of users;
to analyze values of the time-dependent financial data for each user of the plurality of users, wherein the values are periodically measured over a predetermined period of time;
to identify a plurality of first financial variable trajectories based on the analyzing, wherein the plurality of first financial variable trajectories comprise expressions of financial-based behavior of respective groups of the plurality of users over the predetermined period of time;
for a set of first financial variable time-dependent data for a new user, to determine a best fitting trajectory from the plurality of first financial variable trajectories;
to automatically generate at least one message configured to cause execution of one or more tasks on a recipient device selected from a user device associated with the new user and a provider device associated with a provider, wherein the at least one message has one or more formats compatible with the recipient device and the provider device;
to transmit the at least one message, via a distributed network, to the recipient device, the at least one message comprising content determined at least in part by the best fitting trajectory;
wherein the one or more tasks comprise:
a modification of a user interface of the recipient device to display the content, wherein the content comprises an offer for a financial product, and wherein at least one variable pertaining to the financial product is determined at least in part by the best fitting trajectory;
a modification of the user interface of the recipient device to display the at least one variable; and
an alteration of an application stored in a memory of the recipient device to display a new field related to the financial product.

10. The system of claim 9, wherein the one or more tasks are configured to result in a non-volatile change to the recipient device and further comprise at least one of: a change in a setting in the recipient device; an automatic configuration of an alert schedule to provide scheduled reminders to the new user or to the provider; and an updating of a profile of the new user on the provider device.

11. The system of claim 9, wherein the first financial variable is selected from a savings account balance, an outstanding credit balance, a credit capacity, a length of credit history, a number of deposits, a number of withdrawals, a number of loans, a number of repayments, a number of balance queries, an amount of interest earned over time, an amount of largest deposit, an amount of largest withdrawal, an average deposit, and an average withdrawal.

12. The system of claim 9, wherein the plurality of first financial variable trajectories comprises between 2 and 10 trajectories.

13. The system of claim 9, wherein the program instructions further instruct the processor:
to retrieve additional time-dependent financial data for a plurality of additional financial variables for the plurality of users;
to analyze values of the additional time-dependent financial data for each user of the plurality of users, wherein the values of the additional time-dependent financial data are periodically measured over a predetermined period of time; and
to identify a plurality of additional financial variable trajectories for each of the plurality of additional financial variables based on the analysis of the values of the additional time-dependent financial data.

14. The system of claim 13, wherein the program instructions further instruct the processor to determine best fitting trajectories for each of the plurality of additional financial variables for the new user from the plurality of additional financial variable trajectories for each of the plurality of additional financial variables.

15. The system of claim 9, wherein the message is transmitted to the provider device and wherein the content further comprises characterization of the new user based on the best fitting trajectory.

16. The system of claim 9, wherein the at least one variable is selected from a loan amount, an interest rate, and a repayment schedule.

* * * * *